F. D. BLAUVELT.
PISTON RING.
APPLICATION FILED JUNE 8, 1918.
1,313,784.
Patented Aug. 19, 1919.
2 SHEETS—SHEET 1.
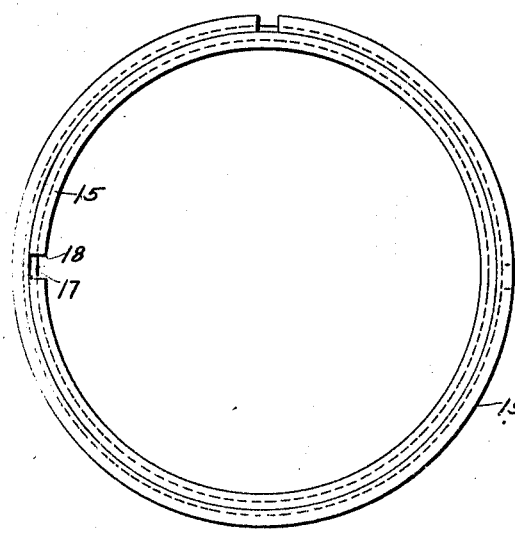
Fig. 1,
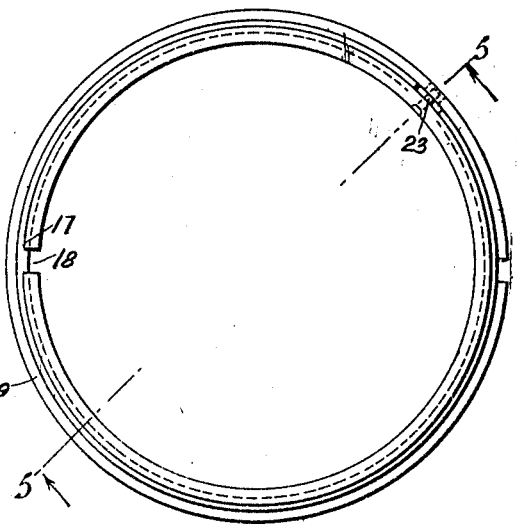
Fig. 2,
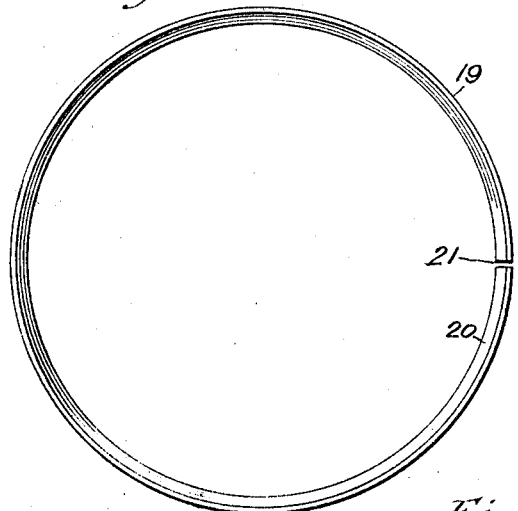
Fig. 3,
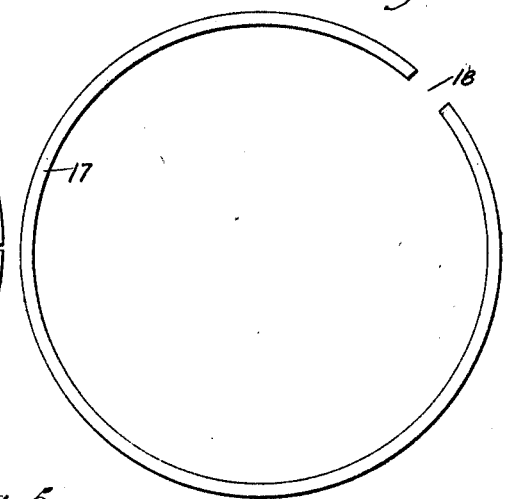
Fig. 4,
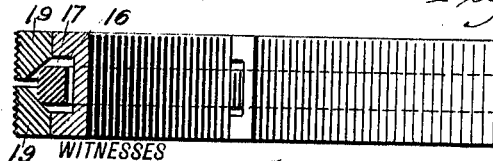
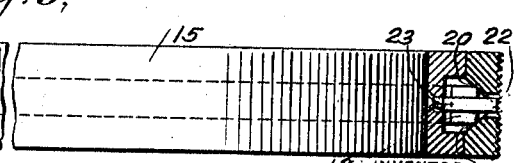
Fig. 5,
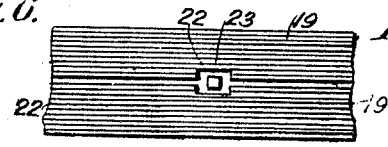
Fig. 6.
WITNESSES
Edw. Thorpe,
B. Joffe
INVENTOR
Frederic D. Blauvelt
BY
ATTORNEYS

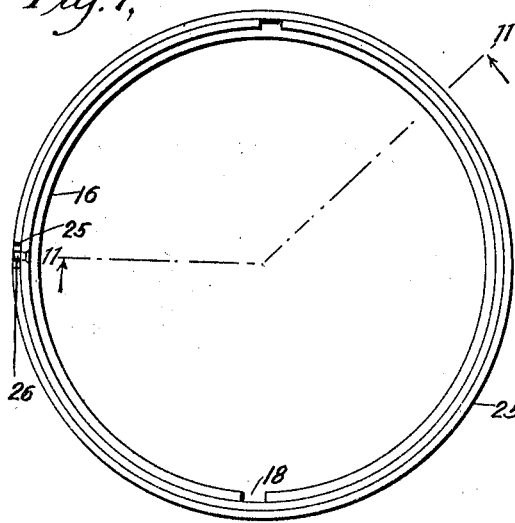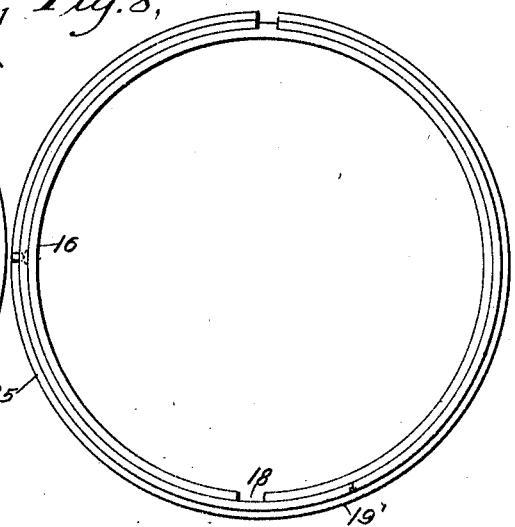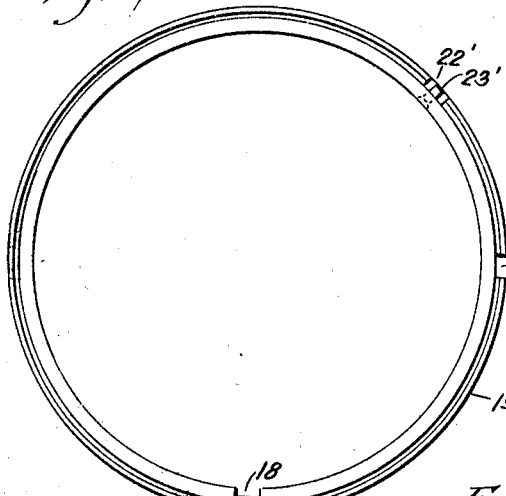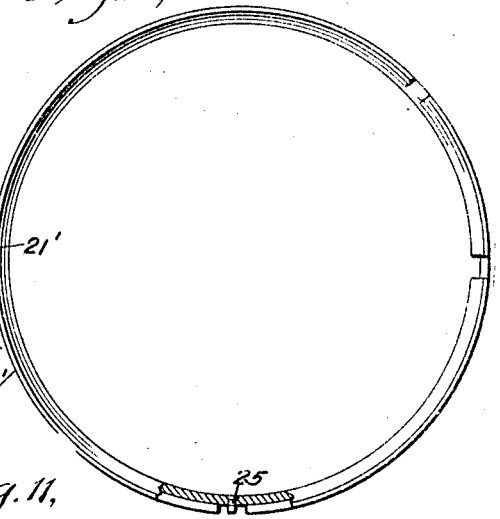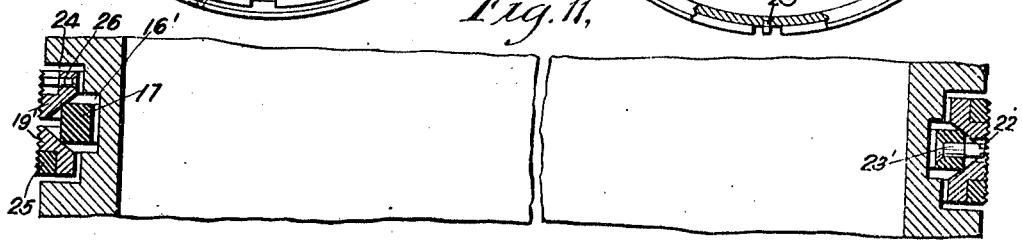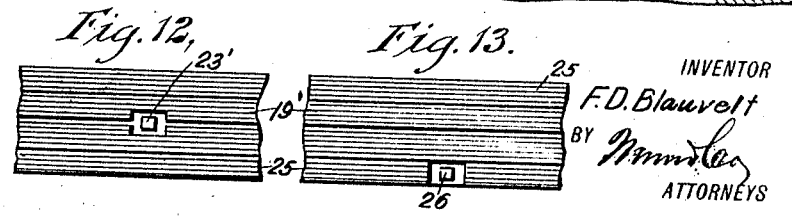

UNITED STATES PATENT OFFICE.

FREDERIC D. BLAUVELT, OF EAST ORANGE, NEW JERSEY.

PISTON-RING.

1,313,784. Specification of Letters Patent. Patented Aug. 19, 1919.

Application filed June 8, 1918. Serial No. 238,947.

*To all whom it may concern:*

Be it known that I, FREDERIC D. BLAUVELT, a citizen of the United States, residing at East Orange, in the county of Essex and State of New Jersey, have invented a new and Improved Piston-Ring, of which the following is a full, clear, and exact description.

My invention relates to a composite piston ring, and has reference more particularly to a piston ring formed of a plurality of rings coacting to produce a tight packing piston ring.

An object of the invention is to provide a composite ring particularly adaptable for internal-combustion engines subject to high compression, such as crude oil, kerosene, gasolene, etc.

Another object of the invention is to provide a ring of the character described which will take the place of a plurality of piston rings used at present.

With the above and other objects in view, the nature of which will more fully appear as the description proceeds, the invention consists in the novel construction, combination and arrangement of parts as herein fully described, illustrated and claimed.

In the accompanying drawings, forming part of the application, similar characters of reference indicate corresponding parts in all the views.

Figure 1 is an elevation of a composite piston ring embodying my invention;

Fig. 2 is a similar elevation showing the front packing ring removed from the piston ring;

Fig. 3 is an inside elevation of a packing ring;

Fig. 4 is an elevation of the expansion ring;

Fig. 5 is a section through the composite ring on line 5—5, Fig. 2;

Fig. 6 is an enlarged edge elevation of a fragment of the composite ring;

Fig. 7 is an elevation of a modified structure of the composite ring;

Fig. 8 is a similar elevation with the upper, secondary packing ring removed;

Fig. 9 is a similar elevation with the two upper packing rings removed;

Fig. 10 is an inside elevation of a main packing ring partially broken out to show the method of engagement between the secondary and the main packing rings;

Fig. 11 is a cross section through a piston and a composite ring on line 11—11, Fig. 7 to illustrate the groove necessary for a composite ring of this character;

Fig. 12 is a fragmentary edge elevation of the piston ring showing the manner of limiting the rotation between the main packing rings and the expansion ring; and Fig. 13 is an edge elevation showing the manner of limiting the relative rotation between the primary and secondary packing rings.

Referring to the drawings, 15 is the carrier ring, which is preferably made of cast iron suitable for this purpose, and in which there is an outer annular groove 16, preferably in the central plane of the ring. The groove 16 forms the seat for an expansion ring 17 made of high carbon tempered steel. Both rings have gaps 18 adapted to form a straight joint, as shown. The carrier 15 preferably also forms an expansion ring the action of which is more limited than the action of the expansion ring 17 due to the difference in material and also difference in construction. The expansion ring 17 is formed to have a diameter larger than the diameter of the cylinder the piston ring is to fit. To make the carrier ring of the same diameter as the diameter of the expansion ring would be impracticable, due to its width and also the material used for the purpose.

Packing rings 19 are mounted to encompass the carrier ring 15 and the expansion ring 17. Each of the packing rings has on its inner face a bevel 20, against which bevels the expansion ring bears. The expansion ring acting on the bevels 20 tends to move the two packing rings 19 apart on the carrier ring 15. And in view of the fact that the separation of the packing rings 19 is limited by the width of the piston ring groove, the ring 17 will also control the lateral expansion of the packing rings if the carrier ring fails to sufficiently expand the packing rings 19 laterally.

The bevel 20 is preferably at an angle of 45° to the bearing faces of the packing rings 19. The said bearing faces are preferably corrugated. The gaps 21 in the packing rings may form a straight joint or a lap joint may be used if so desired. The packing rings 19 are provided with elongated notches 22 in the proximate faces into which enters a pin 23 which is anchored in the carrier ring 15, the pin 23 passing also through the gap 18 of the expansion ring. The pin 23 is set at an angle of 135° to the gap 18 of the carrier ring, and the notches 22 in the packing rings are formed at oppositely-directed angles of 45° from their notches. Therefore the joints of the packing rings are 90° apart, and one of them is 180° from the joint 18 of the carrier and the other 90° from same.

In cases where it is desirable to dispense with the carrier ring, a seat for the expansion ring 17 can be provided directly in the piston groove 24 (see Fig. 11), for which purpose a groove 16' is depressed from the bottom of the groove 24. The packing rings 19' are reduced at their upper outer faces to provide space for secondary packing rings 25, the gaps of which rings 25 have straight joints, as shown. Preferably the secondary packing ring presents as much working surface as the primary ring which carries the secondary ring.

In this construction of the composite ring, the elongated notches 22' in the adjacent faces of the packing rings engage the pin 23', which is in this case anchored in the expansion ring 17 at an angle of 135° from the gap 18 therein. The relative rotation between the primary and secondary packing rings is controlled by pins 26 anchored in the primary packing ring and which are located in the gap of the corresponding secondary packing ring. The pins 26 are so mounted in the primary packing rings that the gaps of the secondary rings are at an angle of 90° from one another.

I claim:

1. A composite piston ring comprising a carrier ring having an outer annular groove, an expansion ring in said groove, a pair of packing rings encompassing said carrier ring and each presenting a beveled surface adapted to bear against the expansion ring and whereby the packing rings are each maintained against the wall of a cylinder and the sides of a piston groove, and means for preventing the rotation of the packing rings on the carrier ring.

2. A composite piston ring comprising a carrier ring having an outer annular groove, a pin in said carrier ring projecting out of the groove, said pin being at an angle of 135° from the joint of the carrier ring, a high carbon tempered steel expansion ring in said groove having its joint engaged by the pin in the carrier, and a pair of packing rings adapted to encompass the carrier ring and each presenting an inner bevel adapted to bear against the expansion ring, each of said packing rings having an elongated notch adapted to be engaged by the pin, said elongated notch being at an angle of 45° from the joint of the packing ring and said notches being so related that the joints of the two packing rings are 90° apart.

3. A composite piston ring comprising a carrier ring, a high carbon steel expansion ring carried by the carrier ring, a pair of packing rings adapted to encompass the expansion ring and each presenting an inner annular bevel against which the expansion ring is adapted to bear, and a pin extending from the carrier ring at an angle of 135° from the joint of said carrier ring, each of said packing rings having an elongated notch adapted to be engaged by the pin, the notch in each of the packing rings being at an angle of 45° from its gap joint and the two notches being so related that the gap joints are 90° apart when the notches of the packing rings engage the pin.

4. A composite piston ring comprising a carrier ring, an expansion ring of high carbon tempered steel, a pair of packing rings encompassing the expansion ring and each presenting an inner annular bevel bearing on the expansion ring, each of said packing rings having an outer annular corrugated face, and means for maintaining the gap joints of all the rings in predetermined relation.

FREDERIC D. BLAUVELT.